Feb. 5, 1924.
B. LIEBOWITZ
1,482,756
BALL AND SOCKET JOINT
Filed Nov. 14, 1921
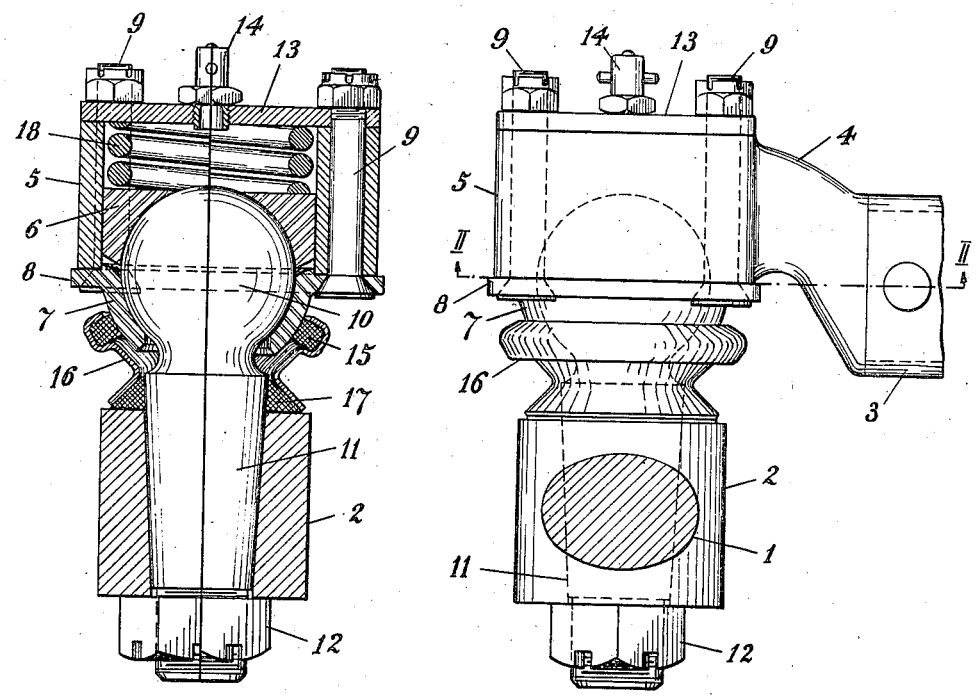
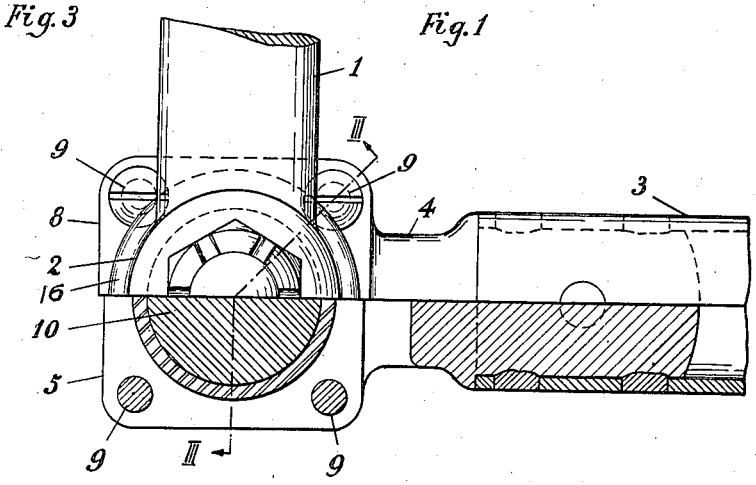
Fig. 3  Fig. 1
Fig. 2
INVENTOR.
BENJAMIN LIEBOWITZ.
BY
ATTORNEY.

Patented Feb. 5, 1924.

1,482,756

UNITED STATES PATENT OFFICE.

BENJAMIN LIEBOWITZ, OF NEW ROCHELLE, NEW YORK.

BALL-AND-SOCKET JOINT.

Application filed November 14, 1921. Serial No. 514,867.

*To all whom it may concern:*

Be it known that I, BENJAMIN LIEBOWITZ, a citizen of the United States, and a resident of the city of New Rochelle, in the county of Westchester and State of New York, have invented certain new and useful Improvements in Ball-and-Socket Joints, of which the following is a specification.

This invention relates to ball and socket joints such as are specially applicable to steering gear connections on automobiles.

The objects of the invention are to provide a ball and socket joint which shall be effectively covered so as to exclude dust and dirt and so as to retain lubricant; to provide a joint of this kind which shall be simple, efficient and inexpensive for quantity production manufacture; and to provide a joint of this kind without increasing the overhang distance from the ball to the ball pin anchorage.

I accomplish these objects by means of the invention illustrated in the accompanying drawings in which Fig. 1 is a side elevation, Fig. 2 is a bottom view, the lower half of which is in section on the line II—II of Fig. 1, and Fig. 3 is a section on the bent line III—III of Fig. 2.

Referring to the drawings: 1 is a lever terminating in a hub 2, such as, for example, the steering arm of an automobile. This arm is to be connected by the ball and socket joint to a tie-rod or drag-link 3. 4 is a forging which is welded or riveted or otherwise fastened to the link 3 and which terminates in a square-shaped, offset head 5. Head 5 forms the casing member and is bored through at right angles to the axis of link 3 and receives an annular ball socket 6.

A cup shaped pressing or casting 7, having a square flange 8, is fastened by bolts 9 to the underface of the casing member 5. This underface is nearly coplanar with the ball center. The inner spherical surface of the part 7 is formed as an annular socket adapted to receive the ball 10 in co-operation with the annular ball socket 6. Ball 10 has a shank 11 which passes through the opening in socket 7 and is received in and securely fastened to the hub 2, as for example, by the taper fit and the nut 12 shown. The top of the head 5 is closed by the plate 13, which is also held down by the bolts 9. 14 indicates any convenient means for introducing lubricant.

The ball-socket 7 has an outer spherical surface which co-operates with the cork or felt gasket 15 and the sleeve 16 in forming a dust cover. The joint between the sleeve 16 and ball pin shank 11 is also closed by a cork or felt gasket 17 as shown, the gasket 17 and gasket 15 being compressed and acting as springs to keep the joints tight.

The spring 18 serves to keep the ball sockets firmly against the ball, to prevent rattle and shake, and to take up wear.

It will be seen that the parts 6 and 7 co-operate to form a spherical socket for the ball 10, and that the resulting ball joint is effectively protected from dust and grit by means of the sleeve 16 and its gaskets 17 and 15, which at the same time serve to retain lubricant. Also, it will be seen that the parts are simple, few in number and inexpensive for quantity production. Also, the distance from the ball center to the hub 2 is reduced to a minimum.

My invention is not to be construed as limited to the specific embodiment shown.

I claim:

1. A ball and socket joint comprising a casing having a bore, a socket piece fitting in the bore, a second socket piece secured to the exterior of the casing and having an external spherical surface, a ball inclosed by the combined socket pieces and having a shank projecting through an opening in the second socket piece, and a sleeve encompassing the external spherical surface of said second socket piece.

2. A ball and socket joint comprising a casing having a bore, a socket piece slidably fitting in the bore, a spring in the bore pressing against said socket piece, a second socket piece secured to the exterior of the casing and having an external spherical surface, a ball inclosed by the combined socket pieces and having a shank projecting through an opening in the second socket piece, and a gasketed sleeve encompassing the external spherical surface of said second socket piece.

3. A ball and socket joint comprising a casing having an open-ended cylindrical bore, an annular socket piece slidably fitting in the bore, a cover plate on the casing, an expanding spring in the bore between the cover plate and the socket piece, a second socket piece having an external spherical surface and fastened to the exterior of the casing by bolts passing through the casing and cover plate, a ball inclosed by the combined socket pieces and having a shank projecting through an opening in the second socket piece, and a gasketed sleeve encompassing the external spherical surface of said second socket piece.

4. In a ball joint for connecting a link and a lever, a casing member connected to said link and having a bore approximately perpendicular to the axis of the link, an annular ball-socket fitting in said bore, a ball-pin extending into said bore, a second ball-socket externally fastened to the casing member, said second ball-socket having an external spherical surface and an opening for the shank of the ball-pin, and a sleeve co-operating with said external spherical surface in enclosing the joint.

5. In a ball joint for connecting a link and a lever, a casing member fastened to said link and having a bore approximately perpendicular to the axis of said link, an annular ball-socket fitting in said bore, a ball-pin extending into said bore, a flanged ball socket bolted to said casing member, said flanged socket having an external spherical surface substantially concentric with its internal spherical surface and having an opening for the shank of the ball-pin, and a sleeve co-operating with said external spherical surface in enclosing the joint.

BENJAMIN LIEBOWITZ.